(12) United States Patent
Liu et al.

(10) Patent No.: US 9,383,497 B2
(45) Date of Patent: Jul. 5, 2016

(54) BACKLIGHT MODULE

(71) Applicants: Chin-Ku Liu, Hsin-Chu (TW); Jhong-Hao Wu, Hsin-Chu (TW)

(72) Inventors: Chin-Ku Liu, Hsin-Chu (TW); Jhong-Hao Wu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 91 days.

(21) Appl. No.: 14/265,375

(22) Filed: Apr. 30, 2014

(65) Prior Publication Data

US 2014/0347883 A1 Nov. 27, 2014

(30) Foreign Application Priority Data

May 22, 2013 (CN) .......................... 2013 1 0193903

(51) Int. Cl.
*F21V 8/00* (2006.01)

(52) U.S. Cl.
CPC .............. *G02B 6/002* (2013.01); *G02B 6/0031* (2013.01); *G02B 6/0036* (2013.01); *G02B 6/0038* (2013.01); *G02B 6/0046* (2013.01)

(58) Field of Classification Search
CPC .............................. G02B 6/002; G02B 6/0021
USPC .......................................... 362/609, 608, 623
See application file for complete search history.

(56) References Cited

U.S. PATENT DOCUMENTS

| 5,673,128 | A | 9/1997 | Ohta et al. | |
| 6,971,782 | B2 * | 12/2005 | Nagakubo | G02B 6/0038 362/348 |
| 7,033,061 | B1 * | 4/2006 | Wu | F21V 5/00 359/599 |
| 7,413,334 | B2 * | 8/2008 | Baba | G02B 6/0021 362/600 |
| 7,999,887 | B2 | 8/2011 | Shiraishi et al. | |
| 2004/0201976 | A1 | 10/2004 | Yu et al. | |
| 2012/0287668 | A1 * | 11/2012 | Richardson | F21V 29/00 362/602 |
| 2012/0314145 | A1 | 12/2012 | Robinson | |
| 2012/0320628 | A1 * | 12/2012 | Chang | G02B 6/0025 362/609 |

FOREIGN PATENT DOCUMENTS

| CN | 101038401 | 9/2007 |
| CN | 201352288 | 11/2009 |
| CN | 101680635 | 3/2010 |
| CN | 101881402 | 11/2010 |
| CN | 102352984 | 2/2012 |

(Continued)

OTHER PUBLICATIONS

"Office Action of China Counterpart Application," issued on Dec. 21, 2015, p. 1-p. 6, in which the listed references were cited.

*Primary Examiner* — Anabel Ton
(74) *Attorney, Agent, or Firm* — Jianq Chyun IP Office (57) ABSTRACT

A backlight module including a light guiding plate, a light source and a block is provided. The light guiding plate includes a first surface, a second surface opposite to the first surface, a light incident surface connecting to the first surface and the second surface, and a side surface opposite to the light incident surface. A thickness of at least part of the light guiding plate decreases progressively from the side surface towards the light incident surface. The light source is disposed beside the light incident surface and is capable of emitting a light beam into the light guiding plate through the light incident surface. The block is disposed beside the side surface and includes a reflecting surface facing towards the side surface. The reflecting surface is a concave surface on the block, and the reflecting surface is capable of reflecting the light beam returning to the side surface.

18 Claims, 6 Drawing Sheets

(56) References Cited

FOREIGN PATENT DOCUMENTS

| CN | 102483522 | 5/2012 |
| CN | 102565916 | 7/2012 |
| TW | 534325 | 5/2003 |
| TW | M247857 | 10/2004 |
| TW | I235807 | 7/2005 |
| TW | I283781 | 7/2007 |
| TW | 201020596 | 6/2010 |

* cited by examiner

BACKLIGHT MODULE

CROSS-REFERENCE TO RELATED APPLICATION

This application claims the priority benefit of China application serial no. 201310193903.1, filed on May 22, 2013. The entirety of the above-mentioned patent application is hereby incorporated by reference herein and made a part of this specification.

BACKGROUND OF THE INVENTION

1. Field of the Invention

The invention relates to an optical module, and more particularly to a backlight module.

2. Description of Related Art

With rapid progress in display techniques, a flat panel display has become mainstream among various displays and replaced a cathode ray tube (CRT). Among various flat panel displays, a liquid crystal display (LCD) has been deeply favored by the consumers for usage. Generally, the LCD is mainly formed by a backlight module and a liquid crystal display. Since the LCD does not emit light by itself, it is required that the backlight module provides a planar light source required for displaying.

Generally, the conventional backlight module is categorized into a direct-type backlight module and a side-type backlight module. For example, the side-type backlight module is usually utilized a light guiding plate to guide light emitted from a light source disposed beside the light guiding plate, so as to provide the planar light source required for a display panel.

For the side-type backlight module which utilizes light emitting diode as the light source, a plurality of light emitting diodes are disposed beside a light incident surface of the light guiding plate. Because the light emitting diode has a specific range of light emitting angles, a phenomenon known as "hot spot" is prone to occur in an area near to the light incident surface of the light guiding plate. The hot spot phenomenon is a problem to cause overall uniformity of the planar light source being lower due to insufficient mixing light distance or uneven mixing light. As a result, it is difficult to improve the overall optical quality of the liquid crystal display panel.

Taiwan Patent No. I283781 discloses a structural design of a light guiding plate, in which steps are capable of destructing a light traveling path formed at a bottom surface of the light guiding plate. P.R.C. Patent No. 101680635 discloses a structural design of a wedge shape light guiding plate, in which a light source and a reflector are respectively disposed at two opposite sides of the wedge shape light guiding plate, and a thickness of the wedge shape light guiding plate at a side near the light source is relatively lower and the thickness of the wedge shape light guiding plate at a side near the reflector is relatively higher. Taiwan Patent No. M247857 discloses a structural design of a wedge shape light guiding plate, in which a light beam is lead to the outside of the light guiding plate by scattering patterns located at bottom of the wedge shape light guiding plate guides. P.R.C. Patent No. 102483522 discloses a light source and a reflector respectively disposed at two opposite sides of the light guiding plate, wherein the reflector includes a curvature. Taiwan Patent No. I235807 discloses a structural design of a light guiding plate, wherein an inclined reflecting surface is provided at an end surface of the light guiding plate opposite to a light source, and light reflected by the reflecting surface is immediately emitted from the light guiding plate. Taiwan Patent No. 534325 discloses a light guiding plate having light sources disposed at two opposite sides, and a reflecting surface at a bottom surface of the light guiding plate is substantially an inclined surface of an inverted V shape. U. S. Patent Publication No. 20120314145 discloses a wedge light guiding plate having a bottom surface coated with a reflecting layer and a wrinkled end surface, wherein the wrinkled end surface is opposite to a light incident surface and the wrinkled end surface is also coated with a reflecting layer. Taiwan Patent No. 201020596 discloses a light guiding plate includes prism microstructures disposed on a top surface and a bottom surface, and an extending direction of a normal of a light incident surface is substantially parallel to an extending direction of the prism microstructures of a light emitting surface.

SUMMARY OF THE INVENTION

The invention is directed to a backlight module which provides a uniform planar light source.

Other objects and advantages of the invention can be further illustrated by the technical features broadly embodied and described as follows.

To achieve one, parts, or all of the purposes and advantages of the invention or other purposes and advantages, an embodiment of the invention provides a backlight module including a light guiding plate, a light source and a block. The light guiding plate including a first surface, a second surface opposite to the first surface, a light incident surface connecting to the first surface and the second surface, and a side surface opposite to the light incident surface and connecting to the first surface and the second surface, wherein a thickness of at least part of the light guiding plate decreases progressively from the side surface towards the light incident surface. The light source is disposed beside the light incident surface and configured to emit a light beam, wherein the light beam enters the light guiding plate through the light incident surface. The block is disposed beside the side surface and includes a reflecting surface facing towards the side surface. The reflecting surface is a concave surface recessed into the block. The reflecting surface is configured to reflect the light beam back to the side surface.

In an embodiment of the invention, the side surface is protruded towards the reflecting surface, and the side surface is touched the reflecting surface.

In an embodiment of the invention, an outline of the side surface and an outline of the concave surface are corresponded to each other.

In an embodiment of the invention, an intersecting line obtained by cutting the concave surface with a reference plane parallel to the first surface is a straight line, and an intersecting line obtained by cutting the concave surface with a reference plane perpendicular to the light incident surface and the first surface is a curved line.

In an embodiment of the invention, the concave surface is a bent surface formed by connecting a plurality of sub-surfaces, and the sub-surfaces are arranged from a side near the second surface to a side near the first surface.

In an embodiment of the invention, a width of the block parallel to a thickness direction of the light guiding plate is greater than or equal to a width of the side surface parallel to the thickness direction the light guiding plate.

In an embodiment of the invention, the backlight module further includes a support base, a back plate and a frame. The support base supports the light guiding plate and the block, wherein the second surface is located between the first surface and the support base. The light source, the light guiding plate, the block and the support base is disposed on the back plate, and the support base is located between the light guiding plate and the back plate. An edge of the light guiding plate, an edge of the back plate, an edge of the support base, the light source and the block are covered with the frame.

In an embodiment of the invention, the block and the support base are integrally formed.

In an embodiment of the invention, the backlight module further includes a reflector, and the reflector is disposed between the light guiding plate and the support base.

In an embodiment of the invention, the first surface includes a light emitting surface and a first inclined surface, the first inclined surface connects to the light incident surface and the light emitting surface, and the light emitting surface connects to the first inclined surface and the side surface, wherein the thickness of the light guiding plate at a boundary between the light emitting surface and the first inclined surface is less than the thickness of the light guiding plate at the light incident surface.

In an embodiment of the invention, the second surface of the light guiding plate includes a second inclined surface and a third inclined surface, the second inclined surface connects to the light incident surface and the third inclined surface, the third inclined surface connects to the second inclined surface and the side surface, wherein the thickness of the light guiding plate at a boundary between the third inclined surface and the second inclined surface is less than the thickness of the light guiding plate at the light incident surface.

In an embodiment of the invention, at least one of the first surface and the second surface of the light guiding plate includes a plurality of strip-shaped surfaces, and each of the strip-shaped surfaces extends from a side near the light incident surface towards a side near the side surface, and the strip-shaped surfaces are arranged along a direction substantially perpendicular to the light incident surface.

In an embodiment of the invention, an intersection line obtained by cutting the strip-shaped surfaces with a reference plane parallel to the light incident surface is of a bent shape.

In an embodiment of the invention, the strip-shaped surfaces are substantially curved surfaces.

In one embodiment of the invention, the light source includes a plurality of light emitting elements.

In an embodiment of the invention, light colors of the light emitting elements are at least partially different.

In an embodiment of the invention, there are no light scattering microstructures disposed on the first surface and the second surface.

Based on above, in the backlight module according to the embodiments of the invention, the light beam from the light incident surface is totally internal reflected at the first surface or the second surface of the light guiding plate, and the reflecting surface is located on the block and disposed facing the side surface of the light guiding plate. Therefore, most of the light beam from the light incident surface may be reflected back to the light guiding plate by the side surface, and refracted by the first surface or the second surface to the outside of the light guiding plate after passing a distance from the light incident surface to the side surface in the light guiding plate. Thus, the mixing distance of the light beam may be effectively increased to reduce the hot spot phenomenon, so that the backlight module may provide a uniform planar light source.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
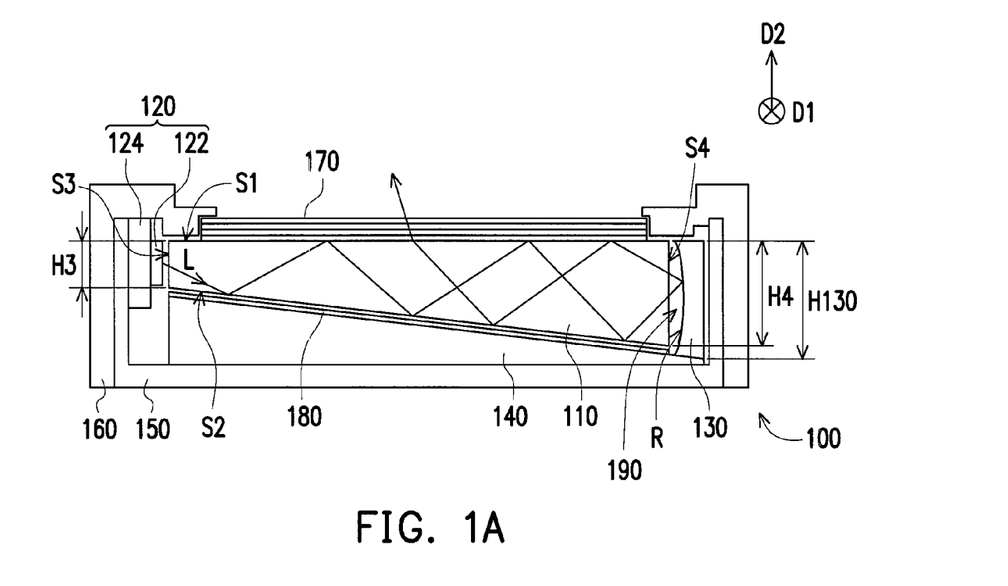
FIG. 1A is a schematic cross-sectional view of a backlight module according to a first embodiment of the invention.
Figure 1B:
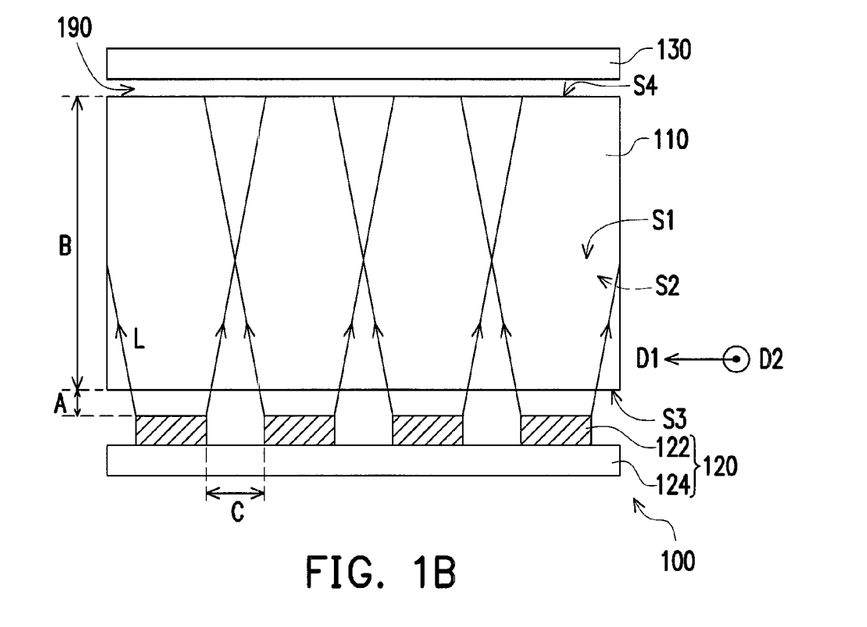
FIG. 1B is a top schematic view of FIG. 1A.

FIG. 1A is a schematic cross-sectional view of a backlight module according to a first embodiment of the invention. FIG. 1B is a top schematic view of FIG. 1A. In order to clearly describe structure of the backlight module, FIG. 1B is only illustrated with a light guiding plate, a light source and a block as depicted in FIG. 1A. Referring to FIG. 1A and FIG. 1B, a backlight module 100 of the present embodiment includes a light guiding plate 110, a light source 120 and a block 130, wherein the light source 120 and the block 130 are respectively located at two opposite sides of the light guiding plate 110.

More specifically, the light guide plate 110 includes a first surface S1, a second surface S2 opposite to the first surface S1, a light incident surface S3 connecting to the first surface S1 and the second surface S2, and a side surface S4 opposite to the light incident surface S3 and connecting to the first surface S1 and the second surface S2. In the present embodiment, the first surface S1 is, for example, a plane, and the first surface S1 is, for example, a light emitting surface, wherein a normal of the light emitting surface is, for example, parallel to the light incident surface S3 and the side surface S4, respectively. In addition, the second surface S2 is, for example, an inclined plane opposite to the first surface S1, and the second surface S2 has, for example, an included angle with the light incident surface.

More specifically, a thickness of at least part of the light guiding plate 110 decreases progressively from the side surface S4 towards the light incident surface S3. In the present embodiment, the thickness of the light guiding plate 110 refers to a distance between the first surface S1 and the second surface S2, and a direction along the thickness of the light guiding plate 110 is substantially parallel to the light incident surface S3. Furthermore, in the present embodiment, the thickness of the entire light guiding plate 110 may decrease progressively from the side surface S4 towards the light incident surface S3. In the light guiding plate 110 of the present embodiment, a thickness H4 at the side surface S4 is, for example, greater than a thickness H3 at the light incident surface S3.

The light source 120 is disposed beside the light incident surface S3 and configured to emit a light beam L. In the present embodiment, the light source 120 includes, for example, a plurality of light emitting elements 122 and a circuit board 124, in which the light emitting elements 122 are disposed on the circuit board 124. In addition, light colors of the light emitting elements 122 may be similar to each other or substantially identical. For instance, the light emitting elements 122 may be a white light emitting diode, but the invention is not limited thereto. In another embodiment, the light colors of the light emitting elements 122 may also be at least partially different. For instance, the light emitting elements 122 may also include red, green and blue light emitting diode, or a combination to the above light emitting diodes. It should be noted that, the light colors and the intensity of the light emitted from the light emitting elements 122 are not particularly limited in the invention. The light colors and the intensity of the light emitting elements 122 may be decided based on actual design requirements.

The block 130 is disposed beside the side surface S4, and the block 130 includes a reflecting surface R facing towards the side surface S4. In the present embodiment, the reflecting surface R is, for example, a concave surface recessed into the block, and an air space 190 is provided between the reflecting surface R and the side surface S4. In comparison with conventional techniques, in which a reflector is directly attached to a light guiding plate (an adhesive is required to be spread first wherein the adhesive has a light transmittance of approximately 90%) or a reflective film is coated on a side surface of a light guiding plate (an interface layer is required to be coated first, and it may lower the light transmittance), the light beam L of the present invention is transmitted in the air space 190 between the side surface S4 and the reflecting surface R. Since air does not cause additional loss to light energy, an overall light emitting brightness may be increased by approximately 10% to 20% in comparison with the conventional techniques.

More specifically, in the present embodiment, an intersection line obtained by cutting the concave surface with a reference plane parallel to the first surface S1 is a straight line, and an intersection line obtained by cutting the concave surface with a reference plane perpendicular to the light incident surface S3 and the first surface S1 is a curved line. In the present embodiment, an extending direction D1 is, for example, a direction substantially parallel to the first surface S1 and substantially parallel to the light incident surface S3; and a thickness direction D2 is, for example, a direction substantially perpendicular to the first surface S1 and substantially parallel to the light incident surface S3.

Moreover, in the present embodiment, a width H130 of the block 130 parallel to the thickness direction D2 of the light guiding plate 110 may be greater than or equal to a width of the side surface S4 (i.e., the thickness H4 of the light guiding plate 110 at the side surface S4) parallel to the thickness direction D2 of the light guiding plate 110. Accordingly, the light beam L emitted from a corner of the light guiding plate 110 may also be returned back into the light guiding plate 110 through reflection of the reflecting surface R. As a result, by adopting above configuration, a problem of light leakage at lateral side of conventional backlight module may be solved, and light utilization may also be increased.

In case that the thickness H4 of the light guiding plate 110 at the side surface S4 becomes thinner with the trend of thinning the light guiding plate 110, when a reflector is attached on the side surface S4 as to replace the block 130, since a width of the reflector may also be reduced, the reflector may not be easily attached on and corresponded to the side surface S4, which induces to decrease in yield rate of fabrication. In addition, even if the reflector is successfully attached on the side surface S4, the reflector will be detached or displaced easily when using time increases. In comparison, the block 130 of the present embodiment is provided with a greater width, such that yield rate of fabrication may be increased since it is easier to be assembled and positioned, and a reliability for future use may also be enhanced.

In the present embodiment, the reflecting surface R is, for example, a surface of the block 130 itself, and material selected for the block 130 is capable of reflecting the light beam L from the side surface S4. For instance, a white polymer material may be used for the block 130 to provide excellent refection efficient.

Figure 2:
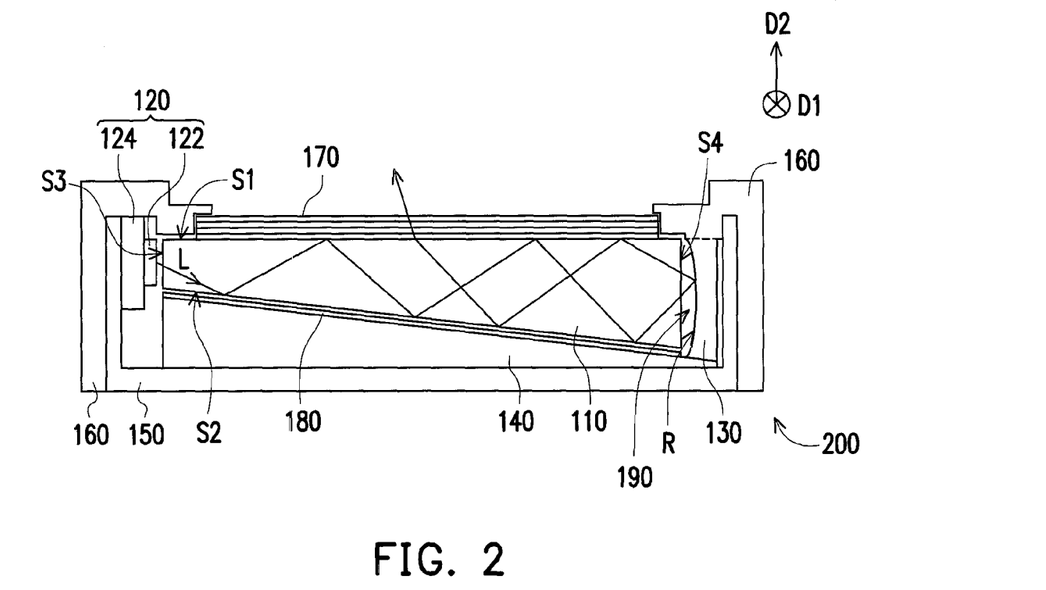
FIG. 2 is a schematic cross-sectional view of a backlight module according to a second embodiment of the invention.

As shown in FIG. 2, a backlight module 200 of the present embodiment may further include a support base 140, a back plate 150 and a frame 160 (e.g. a plastic frame). In the present embodiment, the support base 140 supports the light guiding plate 110 and the block 130, in which the second surface S2 is located between the first surface S1 and the support base 140. For instance, the light guiding plate 110 is, for example, fixed on the support base 140 by using a twin adhesive, but the invention is not limited thereto. In other embodiments, the light guiding plate 110 may also be fixed on the support base 140 by using other fixing methods. In addition, the support base 140 may further be used to support the light source 120.

The light guiding plate 110, the light source 120, the block 130 and the support base 140 are disposed on the back plate 150, in which the support base 140 is located between the light guiding plate 110 and the back plate 150. The frame 160 covers an edge of the light guiding plate 110, an edge of the back plate 150, an edge of the support base 140, the light source 120 and the block 130. In the present embodiment, the backlight module 200 may further include a plurality of optical films 170, in which the optical films 170 are disposed on the first surface S1. The frame 160 may further cover edges of the optical films 170. For instance, the optical films 170 include a diffusion plate, a prism lens and etc.

In the present embodiment, the block 130 and the support base 140 are separately formed, and the block 130 is leaned on the support base 140. However, in other embodiments, the block 130 and the support base 140 may also be integrally formed, but the invention is not limited thereto. As shown in FIG. 2, the block 130 may also be integrally formed with the frame 160, so as to reduce overall volume of the backlight module 200.

In addition, the backlight module 200 of the present embodiment may further include a reflector 180 disposed between the light guiding plate 110 and the support base 140 to reflect light refracted from the second surface S2 back to the light guiding plate 110, so as to improve light utilization of the backlight module 200.

In the present embodiment, the light beam L enters into the light guiding plate 110 through the light incident surface S3, and the light beam L from the light incident surface S3 is totally internal reflected at the first surface S1 or the second surface S2. In addition, after entering into the light guiding plate 110 through the light incident surface S3, the light beam L is transmitted to the reflecting surface R through the side surface S4, then the reflecting surface R reflects the light beam L back to the side surface S4 that the light beam L may enter into the light guiding plate 110 again through the side surface S4, so as to be refracted by the first surface S1 or the second surface S2 to the outside of the light guiding plate.

More specifically, most of the light beam L incoming from the light incident surface S3 in the light guiding plate 110 then emitted to the first surface S1 and the second surface S2 may include an incident angle greater than a critical angle, so as to be transmitted to the side surface S4 of light guiding plate 110 by total internal reflection. On the other hand, the thickness of the light guiding plate 110 decreasing progressively from the side surface S4 towards the light incident surface S3, the incident angle of the light beam L returned from the side surface S4 and emitted to the first surface S1 or the second surface S2 decreases progressively with increasing times that the light beam L is reflected by the first surface S1 and the second surface S2. When the incident angle is less than the critical angle, the light beam L may be refracted at the first surface S1 or the second surface S2 to the outside of the light guiding plate.

Figure 3:
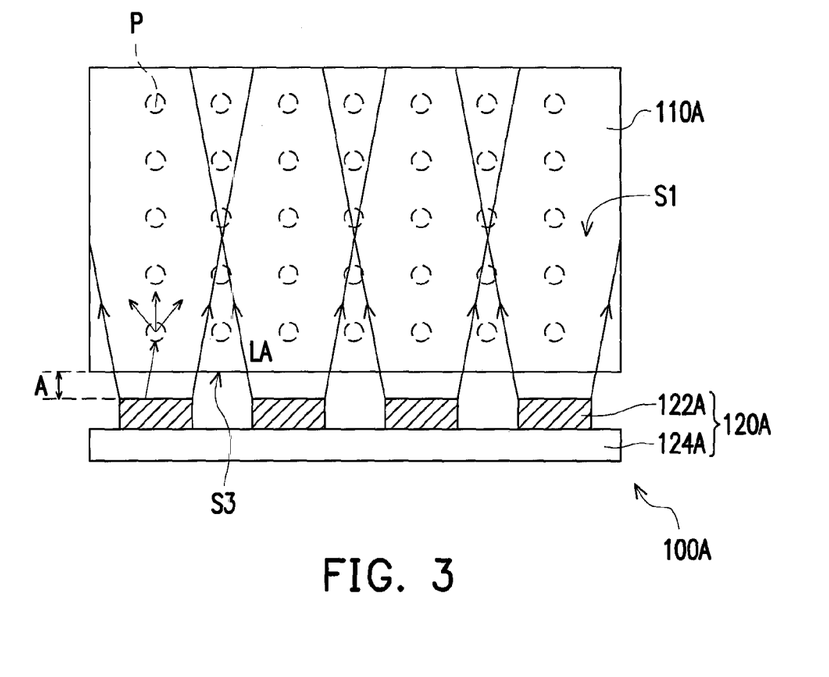
FIG. 3 is a top schematic view of the control group of the backlight module depicted in FIG. 1B.

A control group (FIG. 3) is provided as to compare differences with light mixing distances of the present embodiment (FIG. 1B). FIG. 3 is a top schematic view of the control group of the backlight module 100 depicted in FIG. 1B. In the control group, a backlight module 100A includes a light guiding plate 110A and a light source 120A, in which the light source 120A is disposed beside the light guiding plate 110A, and the light source 120A includes a plurality of light emitting elements 122A and a circuit board 124A. In addition, a light scattering microstructure P (diffusion spot pattern) is disposed at a lower surface of the light guiding plate 110A. Accordingly, the light scattering microstructure P may destruct the total internal reflection so that a light beam LA illuminated from the light source 120A is emitted from the first surface S1. Thus, the light mixing distance of the light beam LA is a distance A between the light source 120A and the light guiding plate 110A in the backlight module 100A of the control group.

In comparison with the embodiment of FIG. 1B, there are no light scattering microstructures disposed on the first surface S1 and the second surface S2. Therefore, after passing a distance from the light incident surface S3 to the side surface S4 in the light guiding plate 110 then returning from the side surface S4, most of the light beam L entered from the light incident surface S3 may be refracted by the first surface S1 or the second surface S2 to the outside of the light guiding plate 110. Accordingly, the light mixing distance of the light beam L in the embodiment of FIG. 1B is a sum of "a distance A between the light source 120 and the light guiding plate 110" and "a distance B between the light incident surface S3 and the side surface S4". That is, in comparison with the backlight module 100A of the control group, the embodiment of FIG. 1B is capable of effectively solving problems of insufficient light mixing distance and uneven light mixing color. Due to improvement in light mixing and uniform light efficiency, the insufficient light mixing distance and uneven light mixing color may not occur even if a gap C between each of the light emitting elements 122 is increased, such that number of the light emitting elements 122 being used may also be reduced. As a result, the hot spot phenomenon may be solved and the manufacturing costs may also be effectively reduced. Thus, the backlight module 200 may provide a uniform planar light source.

In manufacturing process of the light emitting elements 122 (e.g., a light emitting diode), some factors inaccuracy may cause light intensity and colors of the manufactured light emitting elements 122 being inconsistent, so as to further affects light uniformity of the backlight module. Since the light mixing distance of the backlight module 100A of the control group is relatively short, to choose the light emitting elements 122A for proper conditions of light intensity and light colors are relatively more severe in order to prevent the hot spot phenomenon caused by uneven brightness and light mixing, such that the manufacturing costs of the backlight module may be increased, accordingly. Besides, if one of the light emitting elements 122A in the backlight module 100A of the control group cannot work regularly, a dark zone will be occurred apparently of a display which applies the backlight module 100A thereby affecting display quality. In contrast, since the light mixing distance in the embodiment of FIG. 1B is relatively longer, the light source 120 may include a wide variety of selectivities, accordingly. That is, in comparison with the control group, the embodiment of FIG. 1B may have more choices in selecting bin numbers of the light emitting diodes. In addition, even if one of the light emitting elements 122 cannot work regularly, the dark zone may not be easily observed in display screen.

Figure 4:
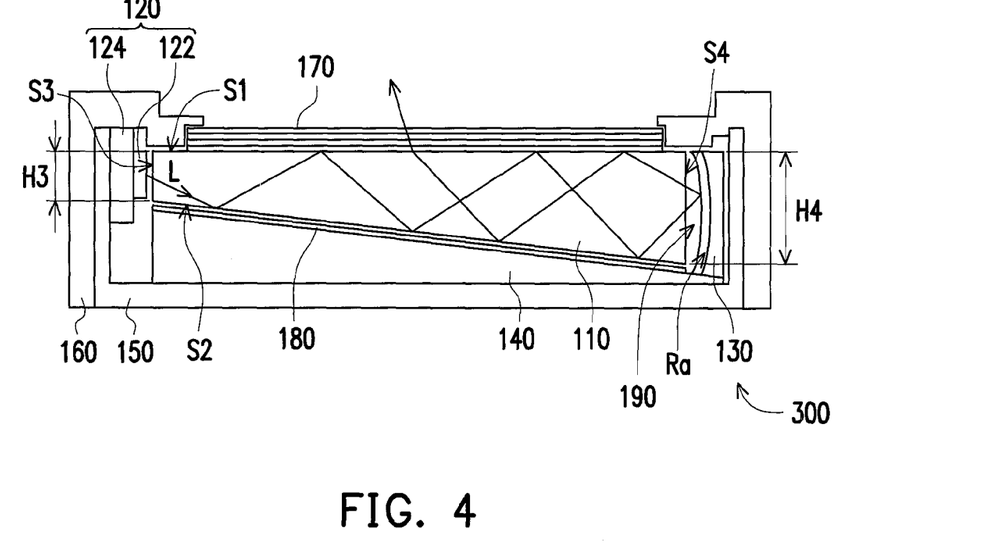
FIG. 4 is a schematic cross-sectional view of a backlight module according to a third embodiment of the invention.

FIG. 4 is a schematic cross-sectional view of a backlight module according to a third embodiment of the invention. Referring to FIG. 4, a backlight module 300 of the present embodiment has similar components, structure and efficiency as the backlight module 100 depicted in FIG. 1A, in which similar description may refer to forgoing embodiments, thus related description is omitted hereinafter. A major difference between the backlight module 100 and the present embodiment is that, a reflecting surface Ra of the block 130 in the backlight module 300 is formed by attaching a reflective material on the block 130 or coating a reflective film on the block 130, in which the reflective material may be a white reflector or a silver reflector. In addition, the reflecting surface Ra may be a mirror reflecting surface or a diffusion surface, but the invention is not limited thereto.

In the present embodiment, insufficient light mixing distance and uneven mixing color may be effectively solved by transmitting most of the light beam L from the light incident surface S3 to be refracted at the first surface S1 and the second surface S2 to the outside of the light guiding plate 110 after passing a distance from the light incident surface S3 to the side surface S4 in the light guiding plate 110 and returning from the side surface S4. As a result, the hot spot phenomenon may be solved, so that the backlight module 300 may provide a uniform planar light source. In addition, since a light mixing distance of the light beam L in the present embodiment is relatively longer, the light source 120 of the backlight module 300 may include a wide variety of selectivities, accordingly. Besides, even if one of the light emitting elements 122 cannot work regularly, the dark zone may not be easily observed in display screen.

Figure 5:
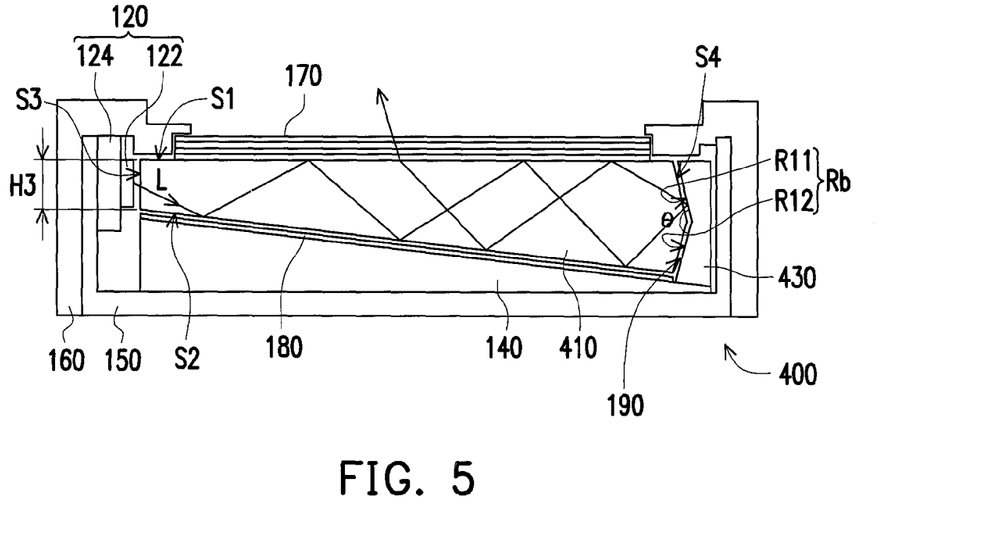
FIG. 5 is a schematic cross-sectional view of a backlight module according to a fourth embodiment of the invention.

FIG. 5 is a schematic cross-sectional view of a backlight module according to a fourth embodiment of the invention. Referring to FIG. 5, a backlight module 400 in the present embodiment has similar components, structure and efficiency as the backlight module 100 depicted in FIG. 1A, in which similar description may refer to forgoing embodiments, thus related description is omitted hereinafter. A major difference between the backlight module 100 and the present embodiment is that, a concave surface (reflecting surface Rb) of the backlight module 400 is a bent surface formed by sub-surfaces R11 and R12 connecting with each other and disposed with different angles, wherein the sub-surfaces R11 and R12 are arranged from a side near the second surface S2 to a side near the first surface S1. In addition, the side surface S4 of the present embodiment is protruded towards the reflecting surface Rb, and the side surface S4 is touched on the reflecting surface Rb.

It should be noted that, although the present embodiment is only illustrated with two sub-surfaces R11 and R12, but the number of the sub-surfaces is not particularly limited in the invention. In addition, the side surface S4 is separated from the reflecting surface Rb in FIG. 5, but the side surface S4 may also be contacted with the reflecting surface Rb according to practical applications. More specifically, an outline of the side surface S4 and an outline of the sub-surfaces R11 and R12 may be corresponded to each other, so that a light guiding plate 410 and a block 430 may be attached to each other.

Furthermore, in the present embodiment, an angle θ is included between the sub-surfaces R11 and R12, in which illumination uniformity of the backlight module 400 is related to the angle θ. More specifically, an emitting position of the light beam L is related to the angle θ. When the angle θ is smaller, the light beam L returning from the side surface S4 is emitted easily from an area near the side surface S4 in the light guiding plate 410. When the angle θ increases, the light beam L is emitted easily from an area near the light incident surface S3 in the light guiding plate 410. The angle θ may be decided according to design requirements, but the invention is not limited thereto.

In the present embodiment, insufficient light mixing distance and uneven mixing color may be effectively solved by transmitting most of the light beam L from the light incident surface S3 to be refracted at the first surface S1 or the second surface S2 to the outside of the light guiding plate 410 after passing a distance from the light incident surface S3 to the side surface S4 in the light guiding plate 410 and returning from the side surface S4. As a result, the hot spot phenomenon may be solved, so that the backlight module 400 may provide a uniform planar light source. In addition, since a light mixing distance of the light beam L in the present embodiment is relatively longer, the light source 120 of the backlight module 400 may include a wide variety of selectivities, accordingly.

Besides, even if one of the light emitting elements 122 cannot operate regularly, the dark zone may not be easily observed in display screen.

Figure 6:
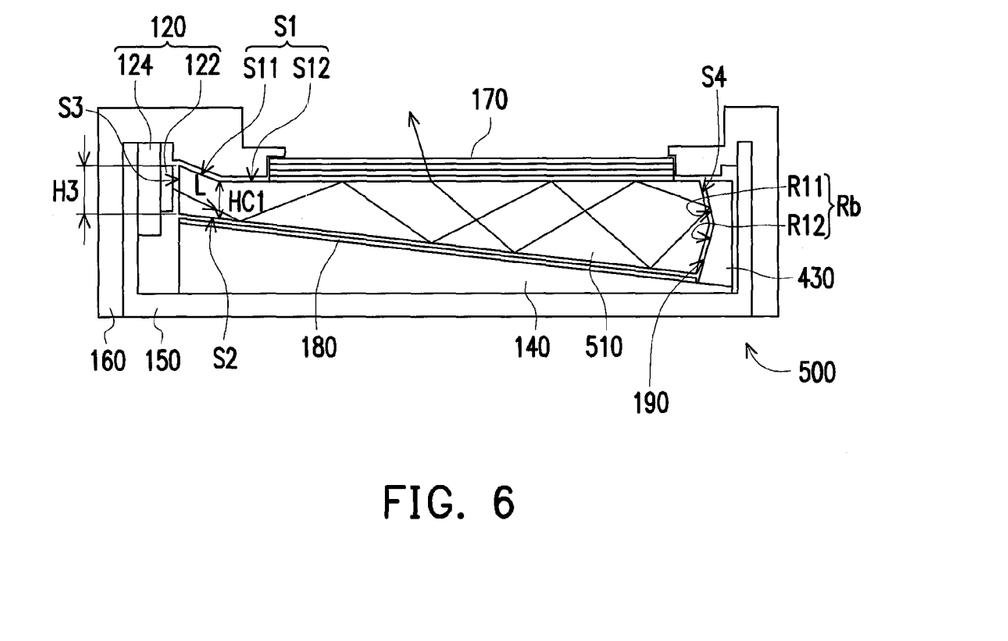
FIG. 6 is a schematic cross-sectional view of a backlight module according to a fifth embodiment of the invention.

FIG. 6 is a schematic cross-sectional view of a backlight module according to a fifth embodiment of the invention. Referring to FIG. 6, a backlight module 500 of the present embodiment has similar components, structure and effectiveness as the backlight module 400 depicted in FIG. 5, in which similar description may refer to forgoing embodiments, thus related description is omitted hereinafter. A major difference between the backlight module 400 and the present embodiment is that, the first surface S1 of a light guiding plate 510 of the backlight module 500 includes a light emitting surface S12 and a first inclined surface S11, in which the first inclined surface S11 connects to the light incident surface S3 and the light emitting surface S12, and the light emitting surface S12 connects to the first inclined surface S11 and the side surface S4.

Furthermore, in the present embodiment, a normal of the light emitting surface S12 is, for example, parallel to the light incident surface S3. In addition, the optical films 170 are, for example, disposed on the light emitting surface S12, in which the first surface S1 is located between the second surface S2 and the optical films 170. Moreover, the frame 160 covers an edge of the light emitting surface S12 and the first inclined surface S11 of the light guiding plate 510.

In the present embodiment, a thickness HC1 of the light guiding plate 510 at a boundary between the light emitting surface S12 and the first inclined surface S11 is less than the thickness H3 of the light guiding plate 510 at the light incident surface S3. Therefore, the light incident surface S3 is capable of being placed with the light emitting elements 122 with a relatively greater size, so as to increased luminous flux of the light emitting surface S3. Thus, an amount of light emitted from the backlight module 500 is further increased.

In the present embodiment, insufficient light mixing distance and uneven mixing color may be effectively solved by transmitting most of the light beam L from the light incident surface S3 to be refracted at the first surface S1 or the second surface S2 to the outside of the light guiding plate 510 after passing a distance from the light incident surface S3 to the side surface S4 in the light guiding plate 510 and returning from the side surface S4. As a result, the hot spot phenomenon may be solved, so that the backlight module 500 may provide a uniform planar light source. In addition, since a light mixing distance of the light beam L in the present embodiment is relatively longer, the light source 120 of the backlight module 500 may include a wide variety of selectivities, accordingly. Besides, even if one of the light emitting elements 122 cannot work regularly, the dark zone may not be easily observed in display screen.

Figure 7:
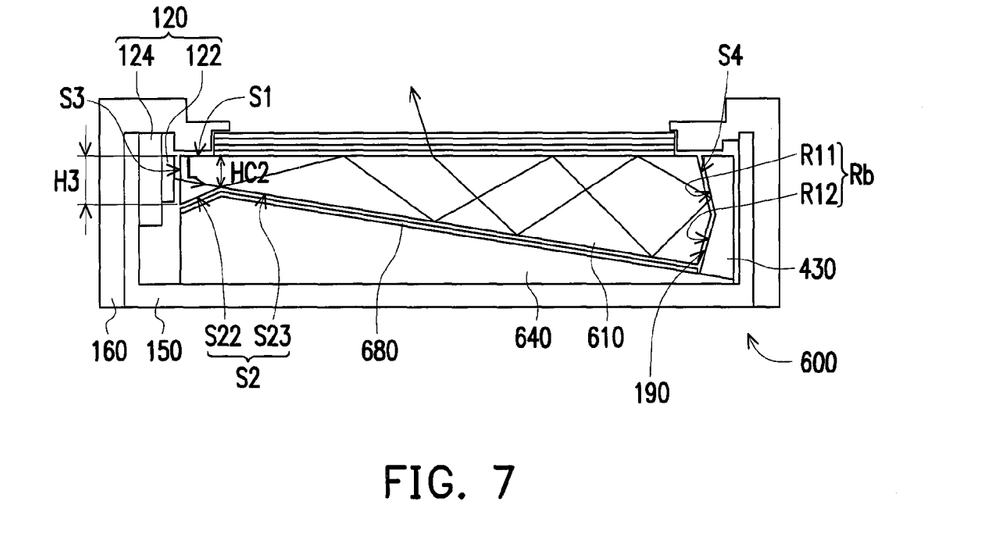
FIG. 7 is a schematic cross-sectional view of a backlight module according to a sixth embodiment of the invention.

FIG. 7 is a schematic cross-sectional view of a backlight module according to a sixth embodiment of the invention. Referring to FIG. 7, a backlight module 600 of the present embodiment has similar components, structure and efficiency as the backlight module 400 depicted in FIG. 5, in which similar description may refer to forgoing embodiments, thus related description is omitted hereinafter. A major difference between the backlight module 400 and the present embodiment is that, the second surface S2 of a light guiding plate 610 of the backlight module 600 includes a second inclined surface S22 and a third inclined surface S23, in which the second inclined surface S22 connects to the light incident surface S3 and the third inclined surface S23, and the third inclined surface S23 connects to the second inclined surface S22 and the side surface S4.

Furthermore, in the present embodiment, the first surface S1 is, for example, a light emitting surface; and the second surface S2 is, for example, a bent surface. In the present embodiment, an upper surface of a support base 640 located below a light guiding plate 610 is, for example, a bent surface which is bent along with the second surface S2, so that the support base 640 and the light guiding plate 610 may be jointed with each other, and a normal of the light emitting surface may be parallel to the light incident surface S3. In addition, a reflector 680 of the present embodiment is, for example, bent along with the second surface S2.

In the present embodiment, a thickness HC2 of the light guiding plate 610 at a boundary between the third inclined surface S23 and the second inclined surface S22 is less than the thickness H3 of the light guiding plate 610 at the light incident surface S3. Therefore, the light incident surface S3 is capable of being placed with the light emitting elements 122 with a relatively greater size, so as to increased luminous flux of the light emitting surface S3 to further increase an amount of the light emitted from the backlight module 600.

In the present embodiment, insufficient light mixing distance and uneven mixing color may be effectively solved by transmitting most of the light beam L from the light incident surface S3 to be refracted at the first surface S1 or the second surface S2 to the outside of the light guiding plate 610 after passing a distance from the light incident surface S3 to the side surface S4 in the light guiding plate 610 and returning from the side surface S4. As a result, the hot spot phenomenon may be solved, so that the backlight module 600 may provide a uniform planar light source. In addition, since a light mixing distance of the light beam L in the present embodiment is relatively longer, the light source 120 of the backlight module 600 may include a wide variety of selectivities, accordingly. And, in case that one of the light emitting elements 122 cannot work regularly, the dark zone may not be easily observed in display screen.

Figure 8:
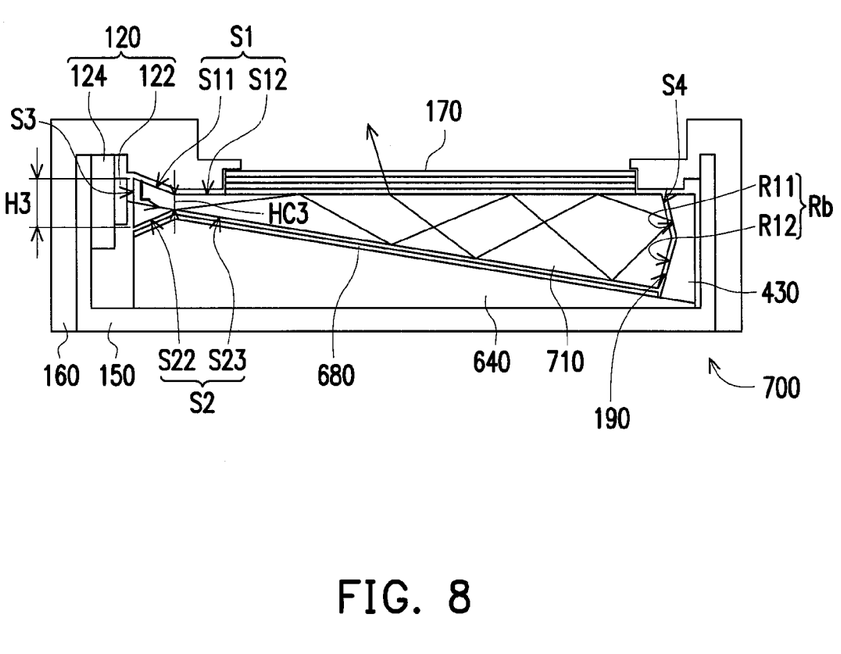
FIG. 8 is a schematic cross-sectional view of a backlight module according to a seventh embodiment of the invention.

FIG. 8 is a schematic cross-sectional view of a backlight module according to a seventh embodiment of the invention. Referring to FIG. 8, a backlight module 700 of the present embodiment is similar to the light modules 500 and 600 depicted in FIG. 6 and FIG. 7, respectively. More specifically, the first surface S1 of a light guiding plate 710 of the backlight module 700 includes the light emitting surface S12 and the first inclined surface S11, in which the first inclined surface S11 connects to the light incident surface S3 and the light emitting surface S12, and the light emitting surface S12 connects to the first inclined surface S11 and the side surface S4. The second surface S2 includes the second inclined surface S22 and the third inclined surface S23, in which the second inclined surface S22 connects to the light incident surface S3 and the third inclined surface S23, and the third inclined surface S23 connects to the second inclined surface S22 and the side surface S4.

In addition, in the present embodiment, a boundary between the third inclined surface S23 and the second inclined surface S22 in the light guiding plate 710 is for example, corresponded to a boundary between the light emitting surface S12 and the first inclined surface S11 in the light guiding plate 710, and a thickness HC3 at said boundaries is, for example, less than the thickness H3 of the light guiding plate 710 at the light incident surface S3. Therefore, the light incident surface S3 is capable of being placed with the light emitting elements 122 with a relatively greater size, so as to increase luminous flux of the light emitting surface S3 to further increase intensity of light emitted from the backlight module 700.

In the present embodiment, insufficient light mixing distance and uneven mixing color may be effectively solved by having most of the light beam L from the light incident surface S3 to be refracted at the first surface S1 or the second surface S2 to the outside of the light guiding plate 710 after passing a distance from the light incident surface S3 to the side surface S4 in the light guiding plate 710 and returning from the side surface S4. As a result, the hot spot phenomenon may be solved, so that the backlight module 700 may provide a uniform planar light source. In addition, since a light mixing distance of the light beam L in the present embodiment is relatively longer, the light source 120 of the backlight module 700 may include a wide variety of selectivities, accordingly. Besides, even if one of the light emitting elements 122 cannot work regularly, the dark zone may not be easily observed in display screen.

It should be noted that, the light guiding plate 710 of the present embodiment may be applied in a backlight module for dual display or transparent display. For instance, in a dual display, the backlight module is required to provide light source to two opposite side of the display panel or bulletin board. In the backlight module for dual display, it is not required the reflector 680 and the support base 640, and the back plate 150 may include an opening so as to approach the requirements for dual display.

Figure 9:
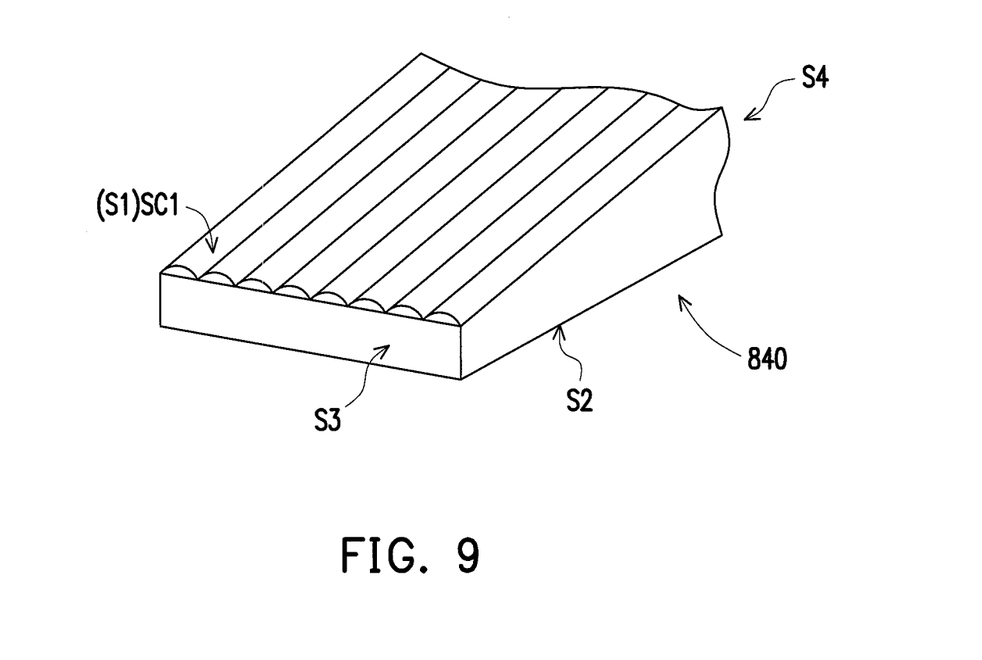
FIG. 9 and FIG. 10 are schematic cross-sectional views of two backlight modules according to embodiments of the invention.
Figure 10:
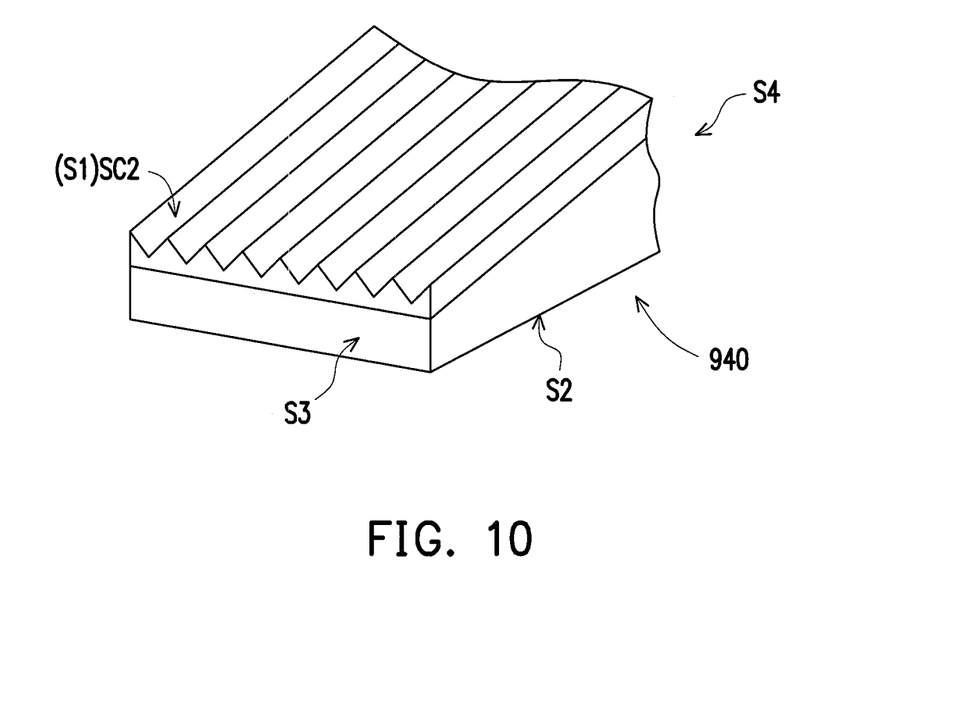

Other possible implementations of light guiding plate in the present invention are described below with reference to FIG. 9 and FIG. 10. Other components of the backlight module are omitted in FIG. 9 and FIG. 10 for convenience in illustration. FIG. 9 and FIG. 10 are partial schematic cross-sectional views of two backlight modules according to embodiments of the invention. Referring to FIG. 9, in a light guiding plate 840 of the present embodiment, the first surface S1 includes a plurality of strip-shaped surfaces SC1, in which each of the strip-shaped surfaces SC1 is substantially a curved surface extending from a side near the light incident surface S3 to a side near the side surface S4, and the strip-shaped surfaces SC1 are arranged along a direction substantially parallel to the light incident surface S3. For instance, the strip-shaped surfaces SC1 are, for example, composed by a plurality of columnar lenses disposed on the first surface S1. It should be noted that, although the present embodiment is only illustrated with the first surface S1 including the strip-shaped surfaces SC1, but the invention is not limited thereto. In other embodiments, at least one of the first surface S1 and the second surface S2 includes the strip-shaped surfaces SC1.

In the present embodiment, by disposing the strip-shaped surfaces SC1, a stripe issue may be solved to increase a ratio of light utilization of the light guiding plate 840. It should be noted that, the design of the strip-shaped surfaces SC1 may also be applied to the light guiding plates 110, 410, 510, 610 and 710 in the first embodiment to the seventh embodiment, so as to increase amounts of light emitting from the backlight modules 100, 200, 300, 400, 500, 600 and 700.

On the other hand, the ratio of light utilization of the light guiding plate may be increased by disposing a V-cut on surfaces of the light guiding plate. Referring to FIG. 10, in a light guiding plate 940 of the present embodiment, the first surface S1 includes a plurality of strip-shaped surfaces SC2, in which each of the strip-shaped surfaces SC2 extends from a side near the light incident surface S3 to a side near the side surface S4, and the strip-shaped surfaces SC2 are arranged along a direction substantially parallel to the light incident surface S3, in which an intersection line obtained by cutting each of the strip-shaped surfaces SC2 with a reference plane (not illustrated) parallel to the light incident surface S3 is a bent shape. For instance, the strip-shaped surfaces SC2 are, for example, composed by a plurality of V-cuts disposed on the first surface S1. It should be noted that, although the present embodiment is only illustrated with the first surface S1 including the strip-shaped surfaces SC2, but the invention is not limited thereto. In other embodiments, at least one of the first surface S1 and the second surface S2 includes the strip-shaped surfaces SC2.

In the present embodiment, by disposing the strip-shaped surfaces SC2, a dark (or bright) stripe issue may be solved and a ratio of light utilization of the light guiding plate 940 may also be increased. It should be noted that, the design of the strip-shaped surfaces SC2 may also be applied to the light guiding plates 110, 410, 510, 610 and 710 in the first embodiment to the sixth embodiment, so as to increase amounts of light emitting of the backlight modules 100, 200, 300, 400, 500, 600 and 700.

It should be noted that, when the strip-shaped surfaces SC1 or the strip-shaped surface SC2 described above being applied to the light guiding plates 510, 610 and 710, the strip-shaped surfaces SC1 or the strip-shaped surfaces SC2 may be applied to at least one of the light emitting surface S11, the first inclined surface S12, the second inclined surface S22 and the third inclined surface S23. In other words, at least one of the light emitting surface S11, the first inclined surface S12, the second inclined surface S22 and the third inclined surface S23 may be disposed with the columnar lenses or the V-cuts. In addition, other surfaces without being disposed with the columnar lenses or the V-cuts may be a plane.

To sum up, in the backlight module according to the embodiments of the invention, the light beam transmitted from the light incident surface is totally internal reflected at the first surface or the second surface of the light guiding plate, and the reflecting surface is located on the block and disposed facing the side surface of the light guiding plate. Therefore, after passing a distance from the light incident surface to the side surface in the light guiding plate and being reflected back to the light guiding plate, most of the light beam transmitted from the light incident surface may be refracted at the first surface or the second surface to the outside of the light guiding plate. Thus, the light mixing distance of the light beam may be effectively increased to solve the hot spot phenomenon, so that the backlight module may provide a uniform planar light source. According to an embodiment, when the light source includes various light colors of the light emitting elements, such design may further solve the problem of uneven mixing color.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A backlight module, comprising:
    a light guiding plate including a first surface, a second surface opposite to the first surface, a light incident surface connecting to the first surface and the second surface, and a side surface opposite to the light incident surface and connecting to the first surface and the second surface, wherein a thickness of at least part of the light guiding plate decreases progressively from the side surface towards the light incident surface;
    a light source being disposed beside the light incident surface and configured to emit a light beam, wherein the light beam enters the light guiding plate through the light incident surface; and
    a block being disposed beside the side surface and including a reflecting surface facing the side surface, wherein the reflecting surface is a concave surface recessed into the block, the reflecting surface is configured to reflect the light beam back to the side surface, and an air space is provided between the reflecting surface and the side surface.

2. The backlight module of claim 1, wherein the side surface is protruded towards the reflecting surface.

3. The backlight module of claim 2, wherein an outline of the side surface and an outline of the concave surface are corresponded to each other.

4. The backlight module of claim 1, wherein an intersecting line obtained by cutting the concave surface with a reference plane parallel to the first surface is a straight line, and an intersecting line obtained by cutting the concave surface with a reference plane perpendicular to the light incident surface and the first surface is a curved line.

5. The backlight module of claim 1, wherein the concave surface is a bent surface formed by connecting a plurality of sub-surfaces, and the sub-surfaces are arranged from a side near the second surface to a side near the first surface.

6. The backlight module of claim 1, wherein a width of the block parallel to a thickness direction of the light guiding plate is greater than or equal to a width of the side surface parallel to the thickness direction of the light guiding plate.

7. The backlight module of claim 1 further comprising:
    a support base supporting the light guiding plate and the block, wherein the second surface is located between the first surface and the support base;
    a back plate, wherein the light guiding plate, the block and the support base is disposed on the back plate, and the support base is located between the light guiding plate and the back plate; and
    a frame, wherein an edge of the light guiding plate, an edge of the back plate, an edge of the support base, the light source and the block are covered with the frame.

8. The backlight module of claim 7, wherein the block and the support base are integrally formed.

9. The backlight module of claim 7, wherein the block and the frame are integrally formed.

10. The backlight module of claim 7, further comprising:
a reflector disposed between the light guiding plate and the support base.

11. The backlight module of claim 1, wherein the first surface includes a light emitting surface and a first inclined surface, the first inclined surface connecting to the light incident surface and the light emitting surface, and the light emitting surface connecting to the first inclined surface and the side surface, wherein the thickness of the light guiding plate at a boundary between the light emitting surface and the first inclined surface is less than the thickness of the light guiding plate at the light incident surface.

12. The backlight module of claim 11, wherein the second surface of the light guiding plate includes a second inclined surface and a third inclined surface, the second inclined surface connecting to the light incident surface and the third inclined surface, the third inclined surface connecting to the second inclined surface and the side surface, wherein the thickness of the light guiding plate at a boundary between the third inclined surface and the second inclined surface is less than the thickness of the light guiding plate at the light incident surface.

13. The backlight module of claim 1, wherein at least one of the first surface and the second surface of the light guiding plate includes a plurality of strip-shaped surfaces, and each of the strip-shaped surfaces extends from a side near the light incident surface towards a side near the side surface, and the strip-shaped surfaces are arranged along a direction substantially perpendicular to the light incident surface.

14. The backlight module of claim 13, wherein intersection line obtained by cutting the strip-shaped surfaces with a reference plane parallel to the light incident surface is a bent shape.

15. The backlight module of claim 13, wherein the strip-shaped surfaces are substantially a curved surface.

16. The backlight module of claim 1, wherein the light source includes a plurality of light emitting elements.

17. The backlight module of claim 16, wherein light colors of the light elements are at least partially different.

18. The backlight module of claim 1, wherein there are no light scattering microstructure disposed on the first surface and the second surface.

* * * * *